United States Patent [19]
Cocita

[11] Patent Number: 5,654,693
[45] Date of Patent: Aug. 5, 1997

[54] LAYERED STRUCTURE FOR A TRANSPONDER TAG

[75] Inventor: Keith Cocita, San Jose, Calif.

[73] Assignee: X-Cyte, Inc., San Jose, Calif.

[21] Appl. No.: 636,903

[22] Filed: Apr. 10, 1996

[51] Int. Cl.[6] ..................................... G08B 13/14
[52] U.S. Cl. .................. 340/572; 342/51; 343/795; 310/313 R; 310/313 B
[58] Field of Search ..................... 340/572, 581; 343/794, 795, 802, 818, 820; 235/380; 342/51, 44, 42; 310/313 R, 313 B

[56] References Cited

U.S. PATENT DOCUMENTS

| | | | |
|---|---|---|---|
| 4,698,631 | 10/1987 | Kelly, Jr. et al. | 340/853.1 |
| 4,725,841 | 2/1988 | Nysen et al. | 342/44 |
| 4,737,789 | 4/1988 | Nysen | 342/51 |
| 4,888,473 | 12/1989 | Rossi et al. | 235/376 |
| 4,951,057 | 8/1990 | Nagel | 342/51 |
| 4,993,000 | 2/1991 | Niitsuma et al. | 367/140 |
| 5,095,240 | 3/1992 | Nysen et al. | 310/313 R |
| 5,182,570 | 1/1993 | Nysen et al. | 343/795 |
| 5,237,235 | 8/1993 | Cho et al. | 310/313 R |
| 5,420,472 | 5/1995 | Cho et al. | 310/344 |
| 5,459,368 | 10/1995 | Onishi et al. | 310/313 R |
| 5,496,611 | 3/1996 | Ikeda et al. | 428/81 |
| 5,528,222 | 6/1996 | Moskowitz et al. | 340/572 |

*Primary Examiner*—Jeffery Hofsass
*Assistant Examiner*—Benjamin C. Lee
*Attorney, Agent, or Firm*—Furgang & Milde, LLP

[57] ABSTRACT

A transponder antenna is carried by a substrate and is sandwiched between the substrate and a cover sheet. A rectangular opening extends through the cover sheet and receives a signal processing chip adhesively carried in a recess below a cap which covers the opening. The chip is spaced with respect to the antenna so as to facilitate inductive coupling between the chip and antenna.

14 Claims, 2 Drawing Sheets

LAYERED STRUCTURE FOR A TRANSPONDER TAG

BACKGROUND OF THE INVENTION—FIELD OF APPLICATION

The present invention relates to transponders, and, more particularly, to the structure of transponders or "tags" which comprise, as a minimum, a substrate, an antenna arranged on the substrate and a signal processing chip (preferably a surface acoustic wave or "SAW" device) coupled to the antenna.

Transponder tags of the aforementioned type receive an interrogating signal from a remote transmitter; process that interrogating signal to generate a reply signal; and transmit the reply signal to a receiver and decoder which receives the transponder generated reply signal and decodes that reply signal for further use. Each transponder is provided with unique encoded information that is incorporated into the reply signal. Such transponders are generally referred to as "passive" because they do not carry a self-contained power source, such as a battery, that must be replaced from time to time. Transponders of this type are described in U.S. Pat. No. 4,725,841 for "System For Interrogating A Passive Transponder Carrying Phase-Encoded Information"; U.S. Pat. No. 5,095,240 for "Inductively Coupled SAW Device And Method For Making The Same"; U.S. Pat. No. 4,737,789, for "Inductive Antenna Coupling for a Surface Acoustic Wave Transponder", and U.S. Pat. No. 4,951,057 for "Inductive Input/Output Coupling for a Surface Acoustic Wave Device". These transponders are used, for example, as personnel identification tags and for vehicle identification on highways and parking lots.

SUMMARY OF THE INVENTION

It is a principal object of the present invention to simplify the construction and manufacture of a transponder tag.

It is a further object of this invention to provide a new and novel layered structure for a transponder tag.

These objects, as well as other objects which will become apparent in the discussion that follows, are achieved, in accordance with the present invention, by providing a transponder tag that sandwiches an antenna between a cover sheet and substrate and provides an opening through the cover sheet to receive a signal processing chip (e.g., a SAW device) disposed beneath a cap so as to be coupled to the antenna, either directly or indirectly.

The signal processor chip is adhesively secured beneath the cap which is, in turn, secured to the top the cover sheet. The cover is fabricated with a rectangular opening that receives the signal processing chip.

According to a further aspect of the present invention, an antenna is provided on a first surface of a substrate and sandwiched between the substrate and a cover. The rectangular opening which extends through the cover receives the signal processing chip adhesively secured beneath the cap so that the chip is spaced from, but is inductively coupled to the antenna.

Other objects, features and advantages of the invention in its details of construction and arrangement of parts will be seen from the above and from the following description of the preferred embodiment when considered with the appended claims.

DESCRIPTION OF THE PREFERRED EMBODIMENTS

Figure 1:
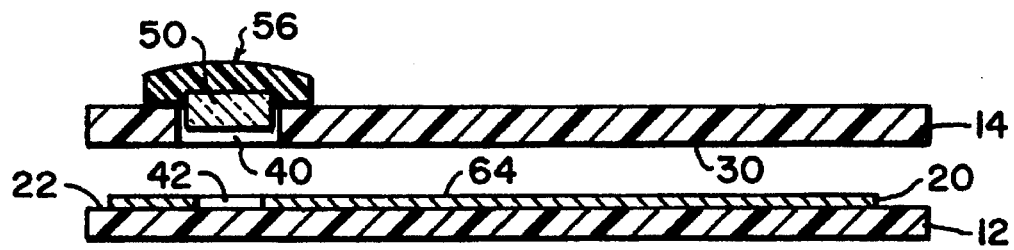
FIG. 1 is an exploded, vertical sectional view, of a transponder tag incorporating the instant invention.
Figure 2:
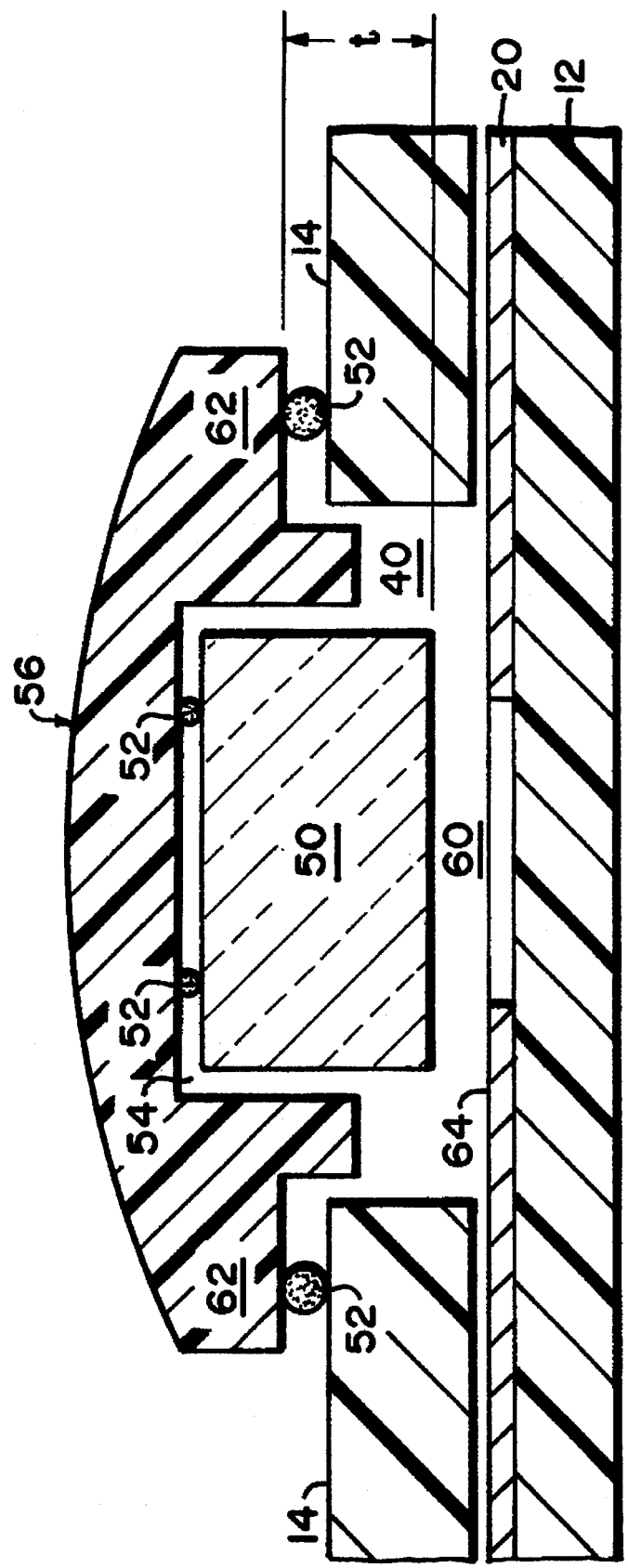
FIG. 2 is an enlarged vertical sectional view of a portion of the transponder tag of FIG. 1 showing the components thereof as they would appear assembled together.

With reference to FIGS. 1 and 2 there is generally shown at 10 a transponder "tag" which includes a substrate 12 and a cover or cover sheet 14. Substrate 12 and cover 14 are each fabricated from materials conventionally utilized for such components in transponder tags such as FR-4 plastic or a similar substance utilized for printed circuit boards.

An antenna 20 of the type and configuration utilized for transponder tags is conventionally applied to a first surface 22 of substrate 12 and may be fabricated from suitable material such as aluminum applied as a foil.

Figure 3:
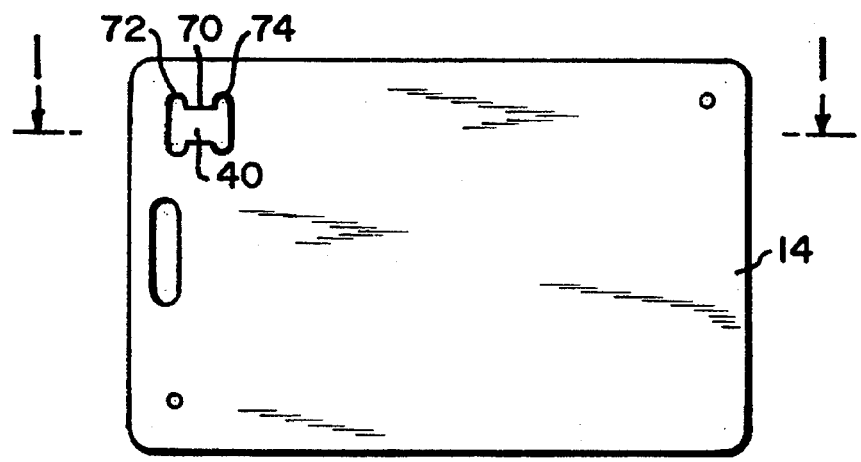
FIG. 3 is a plan view of the cover sheet for the transponder tag of FIGS. 1 and 2, showing the cross-section line I—I for FIGS. 1 and 2.

Cover sheet 14 (FIGS. 1–3) is sized and configured to be applied over antenna 20 so that antenna 20 is sandwiched between surface 30 of cover 14 and surface 22 of substrate 12. Cover sheet 14 and substrate 12 are suitably and conventionally attached.

An opening 40 (FIGS. 1–3) is formed through cover sheet 14 at a location to align with an opening 42 formed in the configuration of antenna 20 to provide suitable inductive coupling of antenna 20 with a signal processing chip 50 secured by a suitable adhesive 52 (FIGS. 1 and 2) in a recess 54 formed within a plastic cap 56. The chip 50 is preferably a surface acoustic wave (SAW) device of the type described in the aforementioned U.S. Pat. Nos. 4,725,841 and 5,095,240. A ridge 62 formed on the cap 56 to surround its recess 54 and recess 54 are sized so that when chip 50 is secured in recess 54 and an air gap 60 is provided between a lower surface (FIG. 2) of the chip 50 and an upper surface 64 of the antenna 20. When the signal processing chip 50 is positioned with respect to antenna 20 as described above and as shown in FIG. 2 a proper inductive coupling is provided between the chip 50 and antenna 20.

FIG. 2 illustrates the layered structure in detail. Starting from the bottom, the layered structure comprises:

An antenna substrate 12 with a transponder antenna 20 disposed on its top surface. The antenna substrate and antenna together preferably have a thickness of 0.018 inches.

A cover 14 arranged over the antenna and having an opening 40 therein to receive a chip. The cover preferably has a thickness of 0.011 inches.

A signal processing chip 50, which may have a thickness of 0.020 inches. This chip is spaced with respect to the antenna by a distance in the range of 0.002 inches–0.004 inches.

Depending upon the lateral dimensions of the chip 50, the cover may have a rectangular opening of 0.250 inches × 0.360 inches.

The cap 56 is configured with a recess 54 and a ridge 62 surrounding the recess such that the chip extends downward through the opening 40 a distance "t" of approximately 0.009 inches. This dimension assumes the insertion of a 0.002 inch layer of adhesive 52 between the cap 56 and the cover layer 14.

Once assembled, the substrate, antenna and cover layer portion of the transponder tag will have a total thickness of 0.030±0.004 inches. The cap will extend outward from this card-like structure an additional 0.015 inches. With the exception of the cap portion, the transponder tag is sufficiently thin to follow the industry standard for a bar coded card or a card with a magnetic stripe, while still serving as a transponder tag that may be read at a distance from 0.5 feet to 30 feet, depending upon the application.

An opening 40 formed through cover sheet 14 (FIGS. 1–3) is located in position to receive the chip 50 for the above described coaction with antenna 20. It should be noted that a central section 70 (FIG. 3) of the opening 40 is substantially rectangular and that first and second end parts 72, 74 respectively thereof extend beyond each side of central section 70 to form a substantially rectangular shaped opening 40.

Figure 4:
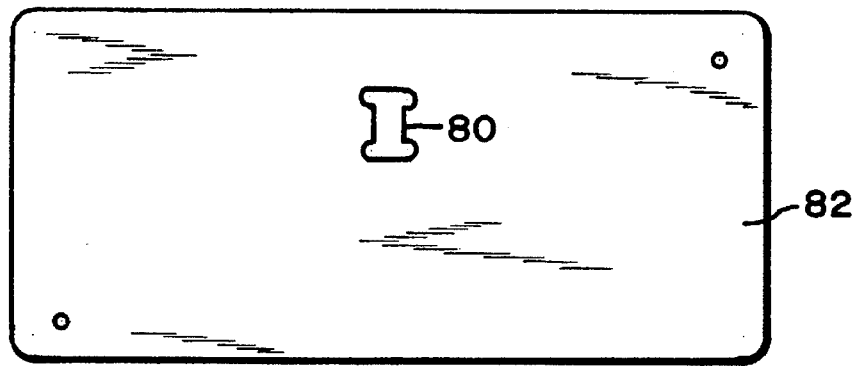
FIG. 4 is a plan view of another embodiment of cover sheet for the transponder tag of FIGS. 1 and 2.

A similarly configured opening 80 (FIG. 4) is provided for a cover sheet 82 for use with a transponder tag wherein the chip 50 is centrally located on the tag. The cover 82 otherwise receives a cap and chip similar to that shown in FIGS. 1 and 2 for coaction with an antenna carried by a substrate. All fabricated and assembled components are similar to like components described with respect to transponder tag 10 of FIGS. 1–3.

From the above description it will thus be seen that there has been provided a new and novel structure for a transponder tag.

It is understood that although there has been described the preferred embodiments of the invention that various modifications may be made in the construction and fabrication thereof without departing from the spirit as comprehended by the following claims.

What is claimed is:

1. A transponder tag, comprising in combination:
   (a) substrate means for carrying transponder components and being formed to a predetermined size and configuration and with at least a first surface;
   (b) transponder antenna means, having an antenna opening thereon, for receiving and transmitting signals and disposed on said first surface of said substrate means;
   (c) cover means arranged over said first surface and covering said antenna means and having at least one opening extending therethrough in substantially axial alignment with said antenna opening;
   (d) cap means having a ridge thereon for covering said cover opening; and
   (e) signal processing chip means carried under said cap means and arranged in said cover opening so as to be inductively coupled to said antenna means through said antenna opening.

2. The transponder tag of claim 1, wherein said opening through said cover means is substantially rectangular shaped.

3. The transponder tag of claim 1, wherein said opening through said cover means is substantially centrally disposed in said cover means.

4. The transponder tag of claim 1, wherein said opening through said cover means is disposed proximate an edge of said cover means.

5. The transponder tag of claim 1, wherein said chip means is carried by said cap means so as to be spaced from said antenna means but still inductively coupled to said antenna means.

6. The transponder tag of claim 5, wherein said cap means is formed with a recess and said chip means is lodged in said recess.

7. The transponder tag of claim 6, wherein said chip means is of greater thickness said cover means.

8. A transponder tag, comprising:
   (a) a substrate formed to a predetermined size and configuration and with at least a first surface;
   (b) a transponder antenna carried by said first surface of said substrate and having an antenna opening thereon;
   (c) a cover of a size and configuration corresponding to said substrate and including at least an opening extending through said cover in substantially axial alignment with said antenna opening;
   (d) a cap having a ridge thereon for covering said cover opening;
   (e) a signal processing chip carried under said cap and arranged in said cover opening, so that said chip is being inductively coupled to said antenna through said antenna opening.

9. The transponder tag of claim 8, wherein said chip is of greater thickness than said cap.

10. The transponder tag of claim 8, wherein said opening through said cover is substantially rectangular shaped.

11. The transponder tag of claim 8, wherein said opening through said cover is substantially centrally disposed in said cover.

12. The transponder tag of claim 8, wherein said opening through said cover is disposed proximate an edge of said cover.

13. The transponder tag of claim 8, wherein said chip is carried by said cap so as to be spaced from said antenna but still inductively coupled to said antenna.

14. The transponder tag of claim 13, wherein said cap is formed with a recess and said chip is lodged in said recess.

* * * * *